(No Model.) 3 Sheets—Sheet 1.
G. BEEKMAN.
REAPING OR MOWING MACHINE.
No. 490,782. Patented Jan. 31, 1893.
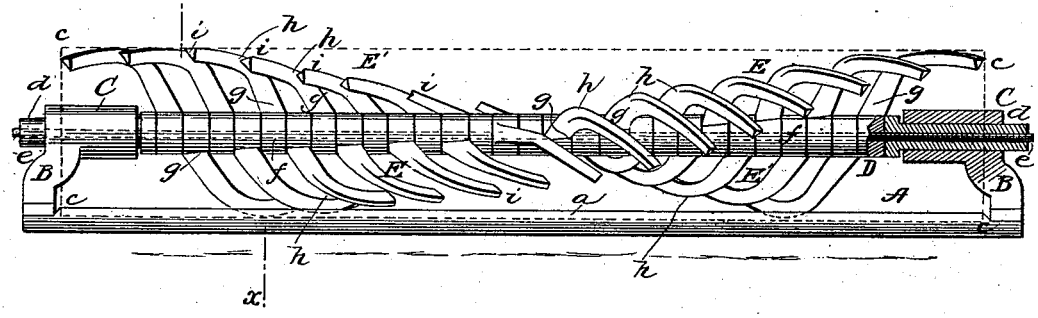
Fig. 1.
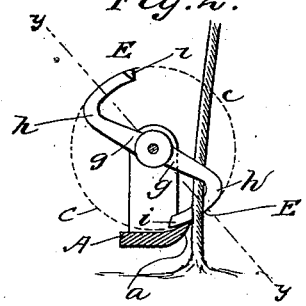
Fig. 2.
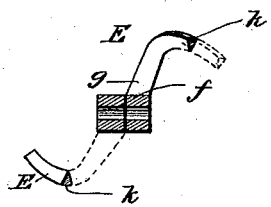
Fig. 3.
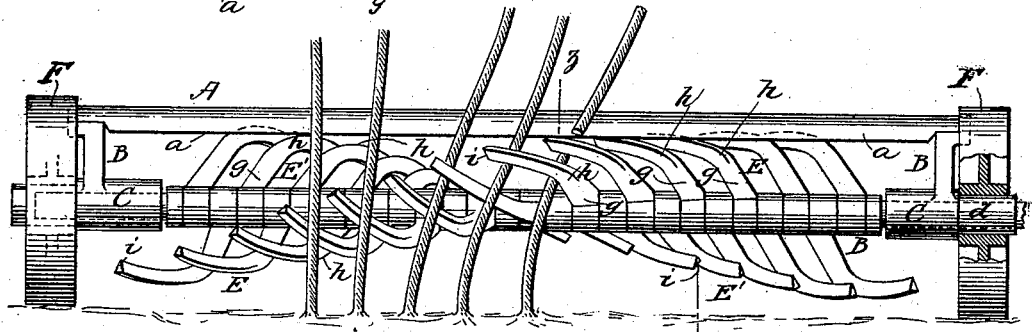
Fig. 4.
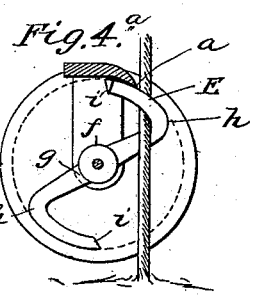
Fig. 4ª.
WITNESSES:
Frank S. Ober
A. R. Dunne
INVENTOR
Gerard Beekman
BY
Henry P. Walker
ATTORNEY (No Model.) 3 Sheets—Sheet 2.

G. BEEKMAN.
REAPING OR MOWING MACHINE.

No. 490,782. Patented Jan. 31, 1893.

WITNESSES:
Frank S. Ober
A. H. Dunne

INVENTOR
Gerard Beekman
BY
Henry F. Parker
ATTORNEY (No Model.)  3 Sheets—Sheet 3.

G. BEEKMAN.
REAPING OR MOWING MACHINE.

No. 490,782.  Patented Jan. 31, 1893.

WITNESSES:
Edward Thorpe
Frank S. Ober

INVENTOR
Gerard Beekman
BY
Henry F. Parker
ATTORNEY

THE NORRIS PETERS CO., PHOTO-LITHO., WASHINGTON, D. C.

UNITED STATES PATENT OFFICE.

GERARD BEEKMAN, OF NEW YORK, N. Y.

REAPING OR MOWING MACHINE.

SPECIFICATION forming part of Letters Patent No. 490,782, dated January 31, 1893.

Application filed May 6, 1892. Serial No. 432,001. (No model.)

*To all whom it may concern:*

Be it known that I, GERARD BEEKMAN, a citizen of the United States, residing in the city, county, and State of New York, have invented certain new and useful Improvements in Reaping or Mowing Machines, of which the following is a specification.

My invention relates to that class of mowing machines having a cutter continuously revolving upon a horizontal axis; and the object of my invention is to adapt such character of cutter to harvesting grain or cutting tall grass.

My invention consists in a series of spiral fingers rotating upon a common horizontal axis; the outer or acting portion of said fingers coinciding with the surface of an imaginary cylinder; and my invention also consists in the conjunction with such spiral fingers of a rectilinear blade having its cutting edge coincident with the surface of said imaginary cylinder, adapted to shear the grain. The spiral fingers are adapted when advancing through the grain to feed the same laterally from the inclined outer surface of one finger into the hook formed by the inner surface of another. The fingers themselves may act as cutters, or if used in conjunction with a blade such as described may functionally act as feeders which thrust the grain against the rectilinear cutting edge.

My invention further consists in the novel relative arrangement of the spiral fingers in reversed positions of projection, as hereinafter described.

Figure 5:
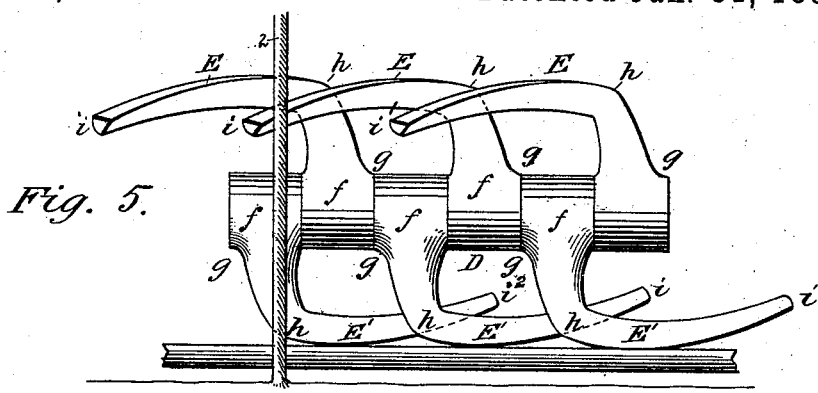
Figure 6:
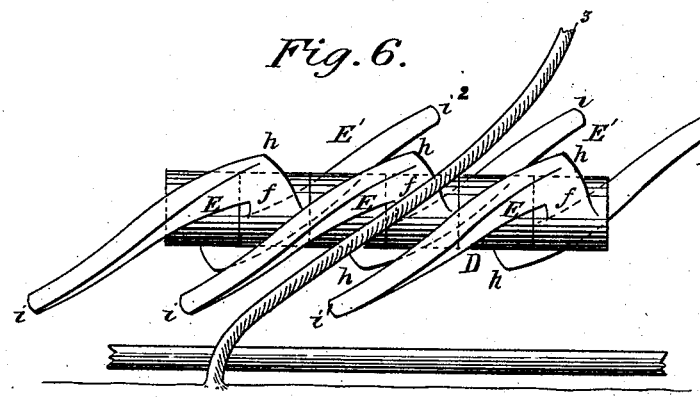
Figure 7:
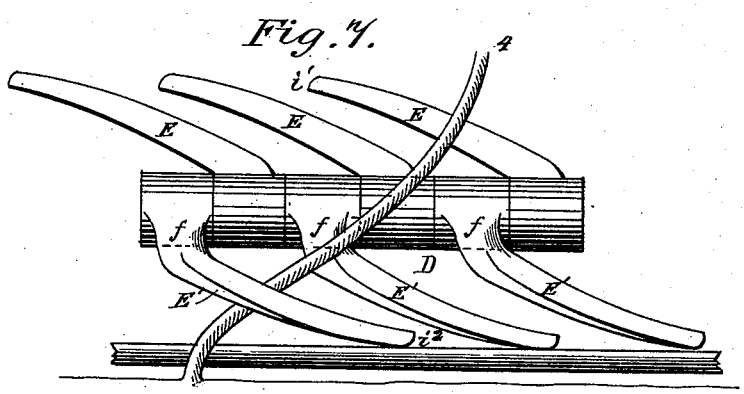
Figure 8:
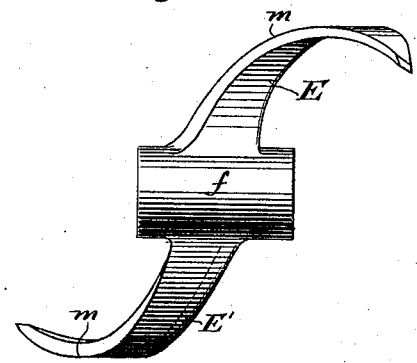
Figure 9:
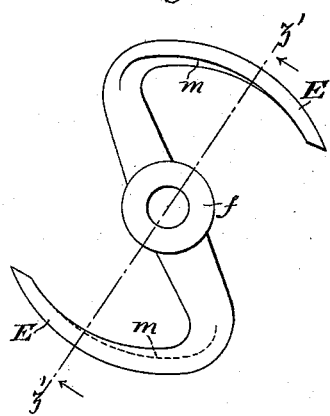

Referring to the accompanying drawings: Figure 1, is a front elevation partly in section showing the cutting apparatus in a position advancing toward the observer. Fig. 2, is a cross sectional view of Fig. 1, taken on the line $x, x$, showing one pair of fingers. Fig. 3, is a sectional view of two adjacent fingers taken on the line $y, y$, of Fig. 2. Fig. 4, is a front elevation partly in section, showing a modified construction of the cutting apparatus in a position advancing toward the observer; and Fig. 4ª, is a cross sectional view taken on the line $z, z$, Fig. 4, showing one pair of fingers. Fig. 5, is an enlarged detail view showing a front elevation of three pairs of fingers at one stage of operation; Fig. 6, a front view of the same showing a second stage of operation; and Fig. 7, a front view of the same showing a third stage of operation. Fig. 8, is an enlarged view illustrating a modification wherein the spiral fingers are themselves provided with cutting edges; Fig. 9, an end view of Fig. 8; and Fig. 10, a sectional view taken on the line $z', z'$, of Fig. 9.

In Fig. 1, B, B, represent the inside and outside shoes of the supporting frame of a cutting apparatus designed for attachment to a suitable carriage of a reaping or mowing machine.

D, is the rotary shaft bearing the spiral fingers which project from said shaft, outward and toward the direction of rotation.

The fingers E, are supported on hubs $f$, that are assembled together on the axial rod $e$, screw threaded at either extremity and provided with nuts $d$, that clamp the hubs $f$, together, and also serve as journals revolving within the bearings C, C. Each finger E, is composed at its base $g—h$, of any suitable or convenient form or curvature, and from the point $h$, to the extremity $i$, such finger lies spirally within the surface of the imaginary cylinder $c, c, c, c$. The cylindric coincidence of the portion $h—i$, of the finger is clearly illustrated in Figs. 2, 4ª, and 9. The portion $g—h$, of each finger is preferably inclined as indicated in Fig. 1, so as to form in continuation with the spiral portion $h—i$, an inclined back, which when presented to the uncut grain or grass and advancing into the same, acts as a lateral feeder therefor, preparatory to its seizure by the extremity $i$, of another finger. The portion $h—i$, acts upon the grain or grass to sever it, after it is thus fed. The extremities $i$, of each finger are located so as to overreach or overlap in the length of the shaft, the initial point or hilt $g$, of the finger following, as will be seen in Fig. 1, and also in Figs. 5 and 6. The fingers E and E', are moreover oppositely projected along the shaft D, as seen in Figs. 1, 4, 5, 6, 7, and 8, and disposed in reversed spiral directions lengthwise of such shaft; or in other words, in lines which if continued would form crossed spirals, being thus inclined at alternating angles. Such arrangement is acquired by placing similar fingers E, E', in reversed positions upon the rod $e$, when assembled, all the fingers being precisely alike and interchangeable; a single one projecting from each hub.

Figure 10:
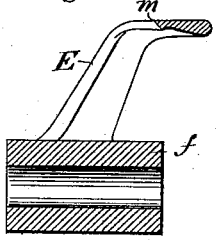
Figure 10:

The frame or bar A connecting the supports B, B, together, comprises in Figs. 1 to 7 inclusive a blade having a cutting edge $a$, coincident with the surface of the imaginary cylinder $c, c$, so that while the fingers E, pass in rotation, their outer spiral portions $h, i$, will pass in close proximity to the said cutting edge $a$, and owing to rapid rotation, force the grain so as to sever it upon the said cutting edge. The fingers E when provided with cutting edges $m$, on their advancing sides as illustrated in Figs. 8, 9, 10, may be employed in conjunction with the blade A, or such fingers E, may also be employed without a cutting edge $m$, and thus act functionally as thrusting fingers only and not as cutters in conjunction with the blade A. The edge $a$, of the blade A, may be variously modified in contour within the surface of the imaginary cylinder $c, c, c, c$ respresented by dotted lines; for example such edge may be serrated, toothed, or otherwise angular, or curved, if desired.

In Figs. 1, 2, 5, 6, and 7, the blade A, is located under the rotary fingers with its cutting edge forward, and the said fingers rotate downward on their advancing side so as to feed the grain thereto.

In Figs. 4, and 4$^a$ the blade A, is shown above the rotary fingers, with its cutting edge forward; the said fingers therefore rotating upward on their advancing side and severing the stalks of grain above their bases.

The fingers E are preferably arranged in a spiral order of succession about the shaft D, as indicated in Figs. 1, and 4, in order to distribute the resistance of cutting as equally as possible throughout the rotation of the shaft.

As seen in Fig. 3, the cross-sectional form of the spiral parts of the feeders are such as to present a V-shaped edge $k$, although not necessarily a knife edge. The edge $k$, is adapted to knock the grain against the blade A and sever it by an abrupt contact which is acquired by a high speed of revolution given to the shaft D. The shaft D, is rotatively connected to be operated by the traction wheels of the machine. In Figs. 1, and 2, the blade A, rests near the ground, and may be counter-balanced by suitable or usual devices. In the modification in Figs. 4, and 4$^a$, the blade A, being above the rotary feeder E, is supported by a suitable roller such as indicated at F, F, in Fig. 4, at both extremities of the frame A, B.

In Figs. 8, 9, and 10, I illustrate the rotary device E, as provided with a sharpened knife edge $m$, in lieu of the obtuse edge $k$, upon the advancing side of the spiral. By employing such edge $m$, in an acute and scythe-like form, the rotary device E, may be used to cut grain, without the abutment of a stationary knife such as A, hereinbefore described.

The fingers E, should be sufficiently strong to act as guards and avoid breakage in case of contact or collision with stones and other obstructions.

The operation of my machine is as follows: When the fingers E first enter the grain as in Fig. 5, they feed the stalk 2 laterally toward the right; when the fingers E have advanced a quarter revolution as in Fig. 6, the stalk will have moved to the position 3 indicated. The said stalk, after its passage over the entire length of the inclined back of the finger E which feeds it, owing to the extreme distance of the base of said stalk from the hook $i'$, of the next finger E, succeeding, will clear the point of the latter, and pass uncut for a finger of the opposite series E' to seize. As illustrated in Fig. 7, the finger E', of the opposite series, the extremity $i^2$ of which has cleared the upper part of the stalk thus inclined, will engage directly with the base thereof in the manner indicated in position 4. At the period of operation illustrated in Fig. 7, the engaging finger E' extends substantially at a right angle to the length of the stalk, thereby insuring its severance upon the blade A as the rotation progresses. A similar operation is repeated in reverse lateral directions of thrust, when the series of fingers E', happen to engage first.

In reference to Figs. 4 and 4$^a$, the operation is direct. That is to say, the grain being seized and swayed laterally on the fulcra of its roots, and caught at a distance above the base of the stalk, will have an opportunity to swing into line with the first extremity $i$ that passes. If the stalk is fed laterally by a finger of the series E, it will ordinarily be caught by the ascending extremity $i$, of the next finger E of the same series. This operation is clearly indicated in the row of stalks, in Fig. 4, each of which is seen at a different successive stage of operation, from first contact until severance.

Having thus fully described my invention, what I claim and desire to secure by Letters Patent is:—

1. The herein-described cutting apparatus for reaping and mowing machines, consisting in a series of spiral fingers rotating on a horizontal axis, projecting in the direction of rotation to form hooks, their acting surfaces describing a cylindrical path; said fingers adapted when advancing through the grain, to feed the same laterally from the inclined outer surface of one finger into the hook formed by the inner surface of another, and to sever the grain by their rotation, substantially as described.

2. In a reaping or mowing machine, the combination of a series of spiral fingers rotating on a horizontal axis, projecting in the direction of rotation to form hooks, their acting surfaces describing a cylindrical path, and a stationary blade having its cutting edge coincident with the said cylindrical path.

3. The herein-described cutting apparatus for reaping or mowing machines, consisting in two series of spiral fingers which project in alternating directions of spiral inclination upon opposite sides of a common axis and form hooks, adapted when they rotate to feed the grain uncut by one series to be seized by the other series, substantially as described.

4. The herein-described cutting apparatus for reaping or mowing machines, consisting in a series of spiral fingers upon a common horizontal axis projecting in the direction of rotation to form hooks; their acting surfaces describing a cylindrical path the position of successive fingers along the shaft being arranged in a gradual spiral progression, substantially as set forth.

GERARD BEEKMAN.

Witnesses:
EUGENE LUCAS,
H. F. PARKER.